(12) United States Patent
Gebert et al.

(10) Patent No.: US 8,114,201 B2
(45) Date of Patent: Feb. 14, 2012

(54) AIR POLLUTION CONTROL FILTER ELEMENTS FOR FILTRATION SYSTEMS

(75) Inventors: Richard E. Gebert, Elkton, MD (US);
Glenn S. Shealy, Hockessin, DE (US);
Tim W. Sherman, Northeast, MD (US);
Steve K. Stark, Wilmington, DE (US);
Zhengtian Xu, Glenn Mills, PA (US)

(73) Assignee: Gore Enterprise Holdings, Inc., Newark, DE (US)

( * ) Notice: Subject to any disclaimer, the term of this patent is extended or adjusted under 35 U.S.C. 154(b) by 407 days.

(21) Appl. No.: 12/255,682

(22) Filed: Oct. 22, 2008

(65) Prior Publication Data
US 2010/0095843 A1    Apr. 22, 2010

(51) Int. Cl.
*B01D 46/02* (2006.01)

(52) U.S. Cl. ............ 96/134; 96/135; 96/138; 96/154; 55/334; 55/492

(58) Field of Classification Search .......... 96/134, 96/135, 138, 151, 154; 95/134; 55/315, 55/334, 492, 524, DIG. 26
See application file for complete search history.

(56) References Cited

U.S. PATENT DOCUMENTS

| | | | |
|---|---|---|---|
| 3,826,066 A | 7/1974 | Higgins | |
| 4,076,692 A * | 2/1978 | Batha et al. | 525/503 |
| 4,595,402 A * | 6/1986 | Silletto et al. | 55/378 |
| 4,874,586 A | 10/1989 | Szymanski et al. | |
| 4,878,930 A * | 11/1989 | Manniso et al. | 55/493 |
| 5,051,391 A | 9/1991 | Tomisawa et al. | |
| 5,288,299 A | 2/1994 | Yoshida et al. | |
| 5,308,369 A * | 5/1994 | Morton et al. | 55/379 |
| 5,620,669 A | 4/1997 | Plinke et al. | |
| 5,843,390 A | 12/1998 | Plinke et al. | |
| 6,331,351 B1 | 12/2001 | Waters et al. | |
| 6,334,881 B1 * | 1/2002 | Giannetta et al. | 55/486 |
| 6,676,722 B1 * | 1/2004 | Clements et al. | 55/378 |
| 7,250,387 B2 | 7/2007 | Durante et al. | |
| 2005/0019240 A1 | 1/2005 | Lu et al. | |
| 2005/0152821 A1 * | 7/2005 | Durante et al. | 423/215.5 |

FOREIGN PATENT DOCUMENTS

EP    1 195 198    10/2002

OTHER PUBLICATIONS

W.L. Gore & Associates, Gore® Filtration Products. Metals Industry. Jan. 2007, 8 pages. W.L. Gore & Associates, Elkton, MD.

* cited by examiner

*Primary Examiner* — Frank Lawrence, Jr.
(74) *Attorney, Agent, or Firm* — Richard W. Ellis

(57) ABSTRACT

An improved filtration apparatus, filtering method and filtering material for capturing mercury and other pollutants in pollutant-laden fluid streams such as flue gases generated by process gas streams are disclosed. The improved filtration system may include two pollutant remediation layers, an upstream layer capable of filtering particulates and a downstream layer capable of adsorbing and/or catalyzing pollutants such as mercury, dioxin, furans, and $NO_x$. The improved filtration system may be in the form of a particulate filter bag. The particulate filter bag may be configured for use in a reverse air filtration system with the upstream layer facing an internal volume of the bag. The upstream layer may include an ePTFE layer laminated to the upstream side of the upstream layer.

37 Claims, 7 Drawing Sheets

AIR POLLUTION CONTROL FILTER ELEMENTS FOR FILTRATION SYSTEMS

BACKGROUND

A variety of industrial fields require the removal of pollutants from a fluid stream. The pollutants may be in the form of particulate and/or chemical pollutants. The fluid stream may, for example, be in the form of flue gasses from an upstream combustion process. For instance, pollutants such as dioxin, furans, mercury and $NO_x$ present a significant problem in many combustion flue gasses. If they escape into the atmosphere, they are potentially damaging to human health and the environment. In many industries and localities these pollutants are presently regulated. Moreover, federal and state authorities regularly introduce new regulations and/or tighten the existing regulations.

Filters systems may be employed to remove particulates from a fluid stream, such as a stream of combustion flue gasses. Such systems may require down time in order for the filter system to be periodically cleaned. Moreover, such systems may include elements that may operate in a manner that limits or precludes reuse thus requiring down time to service such systems. Furthermore, such systems may be expensive to operate and maintain.

SUMMARY

In view of the foregoing, objectives of embodiments described herein may include providing improved filtering methods and apparatuses capable of filtering particulates and/or other pollutants from a pollutant-laden fluid stream with reduced filter system down time, reduced servicing complexity, and/or reduced replacement costs. Additionally, in light of current and potential future pollution regulations, there exists an ongoing need for improvements in pollution filtration systems that effectively remove pollutants from fluid streams. Furthermore, there exists a need to perform the pollutant removal without the creation of voluminous byproducts or waste streams.

In one aspect of the present invention, one or more of the above-stated objectives may be achieved by a provided method of removal of pollutants from a pollutant-laden fluid stream. The method may include passing the pollutant-laden fluid stream first through an upstream element and a then through a downstream element. The method includes passing the pollutant-laden fluid stream through the upstream element to remove particulates from the fluid stream. The upstream element may be configured to remove particulates of a predeterminable size. The method may further include subsequently passing the fluid stream through the downstream element to remediate and/or remove chemical and/or gaseous pollutants from the fluid stream.

In another aspect, one or more of the above-stated objectives may be achieved by a provided method of filtering a pollutant-laden fluid stream in a reverse air filtration system. The pollutant-laden fluid stream may, for example, be a stream of combustion flue gasses from an industrial process. The method may include interconnecting an inlet end of a filter apparatus to an opening in a feed inlet (e.g., a tube sheet) of a reverse air filtration system. The filter apparatus may include a particulate filter bag and a sleeve removably disposed about the particulate filter bag. Removably disposing the sleeve about the particulate filter bag (and/or removably disposing the particulate filter bag within the sleeve) may facilitate particulate filter bag servicing, reuse or replacement independent from the servicing, reuse or replacement of the sleeve. In this regard, during a particular maintenance operation: the particulate filter bag may be serviced or replaced; the sleeve may be serviced (e.g., regenerated) or replaced; or both the particulate filter bag may be serviced or replaced and the sleeve may be serviced or replaced (e.g., the particulate filter bag and the sleeve may both be serviced, the particulate filter bag and the sleeve may both be replaced, the particulate filter bag may be serviced and the sleeve may be replaced, or the particulate bag may be replaced and the sleeve may be serviced). The particulate filter bag may define an internal volume between the inlet end and an oppositely disposed cap end. In this regard, interconnecting the filter apparatus to the tube sheet may interconnect the internal volume of the particulate filter bag to an opening in the tube sheet. The method may further include directing a pollutant-laden fluid stream into the internal volume through the opening in the tube sheet and then passing the fluid stream through the particulate filter bag. As the pollutant-laden fluid stream passes into the particulate filter bag, particulates from the fluid stream may be collected at or near the upstream surface of the particulate filter bag. The fluid stream may continue to flow through the sleeve after it has passed through the particulate filter bag. The method may further include remediating pollutants from the fluid stream by contacting the fluid stream to the sleeve as the fluid stream passes through the sleeve. The pollutant-laden fluid stream may, for example, contain dioxin, furans, mercury and/or $NO_x$, and the sleeve may operable to remediate and or remove such contaminants from the fluid stream.

The particulate filter bag may be oriented in an upstream position relative to the sleeve to protect the sleeve from particulates suspended in the fluid stream. The filtration efficiency of the particulate filter bag may be configured such that most or substantially all particulates of a first given size or larger are filtered from the fluid stream and the filtration efficiency of the sleeve may be configured such that particulates smaller than the first given size are substantially not filtered by the sleeve. In such a configuration, the particulate filter bag may perform a particulate removal function and optional catalytic and/or adsorptive functions, and the sleeve may perform catalytic and/or adsorptive functions. In such a configuration, since the sleeve may perform substantially no mechanical particulate filter duties (as opposed to adsorptive or catalytic duties), the useful life of the sleeve may be dependent on the useful life of catalytic and/or adsorptive components of the sleeve.

In an arrangement, the particulate filter bag may have an air permeability greater than 2 cubic feet per minute/square foot ($cfm/ft^2$) measured at a differential pressure of 0.5 inches water gauge and a filtration efficiency greater than 80% at 0.3 microns (5.3 cm/s). In an embodiment, the particulate filter bag may comprise expanded polytetrafluoroethylene (ePTFE). In an embodiment, the particulate filter bag may be composed of a plurality of layers. For example, the particulate filter bag may include an upstream layer consisting of an ePTFE membrane. Such a membrane may be laminated to a backing layer to form the particulate filter bag. The backing layer may comprise fiberglass.

In an embodiment, the removing step of the current method may include adsorbing pollutants from the fluid stream. For example, the sleeve may include a carbon fabric layer operable to adsorb pollutants. The carbon fabric layer may include activated carbon. The carbon fabric layer may include activated carbon fibers created from novolac and/or novoloid fibers such as those described in U.S. Pat. No. 4,076,692 to Batha et al., which is incorporated herein by reference in its entirety. Such fibers are also known under the trade name Kynol™ and are available from American Kynol, Inc. of Pleasantville, N.Y. 10570. In another example of adsorptive materials that may be present in the sleeve, the sleeve may include activated carbon particles adhered to a support material of the sleeve by a polymer adhesive. The polymer adhesive may include strings of polymer and/or dispersion primary polymer particles. The carbon particles may be tethered to the support material by the polymer adhesive.

In an embodiment, the removing step may include contacting the fluid stream with a catalytic material of the sleeve. The sleeve may comprise a catalytic felt and/or a catalytic fabric. The catalyst of the sleeve may include at least one of noble metals, transition metal oxides, alkali and alkaline earth metals. In another example of catalytic adsorptive materials that may be present in the sleeve, the sleeve may include active particles adhered to a structure of a support material of the sleeve by a polymer adhesive. The term "active" shall mean that the particles are capable of action upon one or more components of the fluid stream, whether by catalysis, reaction, or some combination thereof, so that a modified specie(s) is formed.

An embodiment of current method may further include suspending the directing step to perform a filter apparatus cleaning cycle. During the suspension of the directing step, the fluid stream direction may be reversed to dislodge particulates collected by the particulate filter bag during the collecting step. After completion of the cleaning cycle, the directing step may be resumed. This sequence of suspending normal flow, reversing flow to clean the filter apparatus and resuming normal flow may be repeated a plurality of times, thereby performing periodic cleaning of the filter apparatus.

The filter apparatus cleaning cycle may be performed a plurality of times during the operational life of the particulate filter bag. At some point, for example at the end of the operational life of the particulate filter bag, the method may include detaching the sleeve from the particulate filter bag, then placing the sleeve about a replacement particulate filter bag, and then installing the replacement particulate filter bag with the sleeve into the reverse air filtration system. In another example, at a predeterminable point, such as when the sleeve has adsorbed a predetermined amount of pollutants or after a predetermined number of hours in service, the method may include detaching the sleeve from the particulate filter bag and then regenerating the sleeve. After regeneration, the sleeve may be reused. Such reuse may be in the same reverse air filtration system or in another filtration system. Such reuse may be in the form of performing the same function (e.g., pollution remediation) as performed prior to regeneration.

In another aspect, one or more of the above-stated objectives may be achieved by a provided method of servicing a filter apparatus of a reverse air filtration system that includes accessing a filter apparatus of a reverse air filtration system, then disconnecting a sleeve removably disposed about a particulate filter bag of the filter apparatus from a cap end of the filter apparatus, then removing the sleeve from the filter apparatus, followed by installing the sleeve about a replacement particulate filter bag, and then removably connecting at the cap end the sleeve to the filter apparatus. The filter apparatus may define an internal volume between the cap end and an oppositely disposed inlet end. The inlet end may be operative for interconnection to a pollutant-laden fluid stream.

In an embodiment, the method may further include removing the filter apparatus from the reverse air filtration system prior to the disconnecting step and replacing, after the removably connecting step, the filter apparatus into the reverse air filtration system. The removing step may include sliding the sleeve over the inlet end or the cap end of the particulate filter bag. The installing step may include sliding the sleeve over the inlet end or the cap end of the replacement particulate filter bag. The method may also include replacing the particulate filter bag with the replacement particulate filter bag after the disconnecting and removing steps and prior to the installing and removably connecting steps. For example, the particulate filter bag may be removed from the end cap and the replacement particulate filter bag may then be interconnected to the end cap.

In another aspect of the present invention, one or more of the above-stated objectives may be achieved by a provided apparatus that includes an upstream element and a downstream element, wherein the upstream element is positioned such that a pollutant-laden fluid stream to be filtered would pass through the upstream element prior to passing through the downstream element. The upstream element may be configured to remove particulates of a predeterminable size. The downstream element may be configured to remediate and/or remove chemical and/or gaseous pollutants from the fluid stream.

In still another aspect of the present invention, one or more of the above-stated objectives may be achieved by a provided filter apparatus for use in a reverse air filtration system. The filter apparatus may include a particulate filter bag, at least one support disposed along a longitudinal axis of the particulate filter bag and a sleeve removably disposed about the particulate filter bag and the at least one support. Removably disposing the sleeve about the particulate filter bag may facilitate particulate filter bag service, reuse or replacement independent from the service, reuse or replacement of the sleeve. The sleeve may be disposed on the downstream surface side of the particulate filter bag. The particulate filter bag may have an inlet end for operative interconnection to a pollutant-laden fluid stream. The particulate filter bag may define an internal volume between the inlet end and an oppositely disposed cap end. The particulate filter bag may have an upstream surface facing the internal volume and a downstream surface facing away from the internal volume. The supports may be operative to support the particulate filter bag and maintain the internal volume. The sleeve may contain adsorptive and/or active components, such as those described above, to remediate pollutants passing into the filter apparatus.

Such a filter apparatus may be operable to replace existing reverse air filter elements without significant modifications to the reverse air baghouse or other components. Furthermore, such a filter apparatus may replace a pollution control system that utilizes activated carbon powders injected into a pollutant-laden fluid stream upstream of a reverse air filter element.

The removably connected sleeve arrangement may be particularly beneficial where adsorptive and/or catalytic properties of the sleeve are relatively costlier to produce than the particulate filter bag. Thus, at the end of the useful life of the particulate filter bag, only the particulate filter bag need be replaced. The sleeve may be removed from the used particulate filter bag and placed around a replacement particulate filter bag. Thus the life cycles of the particulate filter bag and the sleeve may be decoupled.

In an embodiment, the at least one support may be in the form of a plurality of rings oriented perpendicularly to the longitudinal axis of the particulate filter bag and sewn into the particulate filter bag. The rings may keep the particulate filter bag from collapsing during reverse air cleaning cycles. The sleeve may be disposed about the particulate filter bag. The sleeve may be in tension circumferentially about the particulate filter bag.

The filter apparatus may include a cap disposed at the cap end of the particulate filter bag. The cap may be operable to removably interconnect to the sleeve to retain the sleeve during operation of the reverse air filtration system. The sleeve may further include an abrasion resistant cuff disposed at an end of the sleeve corresponding to the inlet of the particulate filter bag. The filter apparatus may include a hook extending from the cap in a direction opposite from the particulate filter bag.

In another aspect, one or more of the above-stated objectives may be achieved by a provided filter system that includes a first element operable to filter particulates from a fluid stream and a second element to remove mercury from the fluid stream. The first element may have an upstream side and a downstream side and the upstream side may be operable to be oriented toward a fluid stream to be filtered. The second element may be disposed on the downstream side of the first element. The second element may comprise activated carbon fibers created from at least one of novolac and novoloid fibers. The second element may be removably disposed proximate to the first element (and/or the first element may be removably disposed proximate to the second element) such that the second element may be serviced (e.g., regenerated), reused or replaced independent from the service, reuse or replacement of the first element.

In an embodiment, the first element may be a particulate filter bag and the second element may be disposed about the particulate filter bag. The first element may define an internal volume between an inlet end and an oppositely disposed cap end and the upstream side of the particulate filter bag may face the internal volume. In another embodiment, the first element may define an internal volume between an outlet end and an oppositely disposed cap end and the downstream side of the particulate filter bag may face the internal volume.

In a related aspect, one or more of the above-stated objectives may be achieved by a provided method of removing mercury from a fluid stream that includes providing a filter system, placing the filter system in the fluid stream with an upstream element in an upstream position to protect a downstream element from particles suspended in the fluid stream, passing the fluid stream through the upstream element to remove particles from the fluid stream, and then flowing the fluid stream through the downstream element. As the fluid stream flows through the downstream element, the fluid stream may contact carbon contained in the downstream element. The carbon in the downstream element may be in the form of activated carbon fibers created from at least one of novolac and novoloid fibers and the contact may remove mercury from the fluid stream. The downstream element may be removably disposed proximate to the upstream element (and/or the upstream element may be removably disposed proximate to the downstream element) such that the downstream element may be serviced, reused or replaced independent from the service, reuse or replacement of the upstream element. In this regard, during a particular maintenance operation: the particulate filter bag may be serviced or replaced; the sleeve may be serviced (e.g., regenerated) or replaced; or both the particulate filter bag may be serviced or replaced and the sleeve may be serviced or replaced.

In arrangements where the method includes regeneration of the downstream element, after such regeneration, the downstream element may be reused (e.g., returned to service). Such reuse may be in the same filter system or in another filter system. Such reuse may be in the form of performing the same function (e.g., pollution remediation) as performed prior to regeneration.

In an embodiment of the current aspect, the filter system may be a reverse air filtration system and the upstream element may be in the form of a particulate filter bag. The method may further include directing the fluid stream into an interior of the particulate filter bag through an end of the particulate filter bag prior to the passing step. The fluid stream may then pass through the particulate filter bag (from the interior of the bag to the exterior of the bag) then flow through the downstream element. The downstream element may be in the form of a sleeve along the exterior of the particulate filter bag.

In an arrangement of the current aspect, the filter system may be a pulse jet filtration system. As such, the upstream element may be in the form of a particulate filter bag and the method may further include directing the fluid stream into an interior of said particulate filter bag when performing said passing and flowing steps. In this regard, the fluid stream may pass through the particulate filter bag to enter the interior of the particulate filter bag and then emerge from the interior of the particulate filter bag through an end of the particulate filter bag.

In an aspect, one or more of the above-stated objectives may be achieved by a provided method of servicing a filter apparatus of a pollutant-laden fluid stream filtration system. The filter apparatus may include a first sleeve removably disposed adjacent to a surface of a particulate filter bag. Moreover, the first sleeve may comprise activated carbon fibers created from at least one of novolac and novoloid fibers. The method may include accessing the filter apparatus, separating the first sleeve from the particulate filter bag of the apparatus and then installing a second sleeve such that the second sleeve is removably disposed adjacent to the surface of the particulate filter bag. The second sleeve may comprise activated carbon fibers created from at least one of novolac and novoloid fibers. The method may further comprise regenerating the second sleeve prior to the installing step. The first and second sleeves may be the same sleeve (e.g., the sleeve that is separated from the particulate filter bag may be subsequently regenerated and installed back into the filter apparatus) or the first and second sleeves may be different sleeves.

In still another aspect, one or more of the above-stated objectives may be achieved by a provided filter system that includes a first element operable to filter particulates from a fluid stream and a second element to remove mercury from the fluid stream. The first element may have an upstream side and a downstream side and the upstream side may be operable to be oriented toward a fluid stream to be filtered. The second element may be disposed on the downstream side of the first element. The second element may comprise a mercury adsorptive material for use in removing mercury from the fluid stream. The mercury adsorptive material may include activated carbon particles adhered to a support material of the second element by a polymer adhesive. The mercury adsorptive material may be regenerable. The polymer adhesive may include strings of polymer and/or dispersion primary polymer particles, whereby the carbon particles are tethered by the polymer adhesive. The second element may be removably disposed proximate to the first element (and/or first element may be removably disposed proximate to the second element) such that the second element may be serviced, reused or replaced independent from the service, reuse or replacement of the first element.

In an embodiment, the first element may be a particulate filter bag and the second element may be disposed about the particulate filter bag. The first element may define an internal volume between an inlet end and an oppositely disposed cap end and the upstream side of the particulate filter bag may face the internal volume. In another embodiment, the first element may define an internal volume between an outlet end and an oppositely disposed cap end and the downstream side of the particulate filter bag may face the internal volume.

In a related aspect, one or more of the above-stated objectives may be achieved by a provided method of removing mercury from a fluid stream that includes providing a filter system, placing the filter system in the fluid stream with an upstream element in an upstream position to protect a downstream element from particles suspended in the fluid stream, passing the fluid stream through the upstream element to remove particles from the fluid stream, and then flowing the fluid stream through the downstream element. As the fluid stream flows through the downstream element, the fluid stream may contact carbon contained in the downstream element and mercury in the fluid stream may be adsorbed by the carbon. The carbon in the downstream element may be in the form of activated carbon particles adhered to a support material of the downstream element by a polymer adhesive. The downstream element may be desorbent (e.g., reversibly adsorbent). In this regard, the downstream element may be operable to release the mercury from the carbon contained in the downstream element by exposure to a regeneration process. The downstream element may be removably disposed proximate to the upstream element (and/or the upstream element may be removably disposed proximate to the downstream element) such that the downstream element may be serviced, reused or replaced independent from the service, reuse or replacement of the upstream element.

In another aspect, one or more of the above-stated objectives may be achieved by a provided filter system that includes a particulate filter bag operable to filter particulates from a fluid stream and a second element to remove mercury from the fluid stream. The particulate filter bag may have an upstream side and a downstream side with the upstream side operable to be oriented toward the fluid stream to be filtered. The particulate filter bag may define an internal volume between an inlet end and an oppositely disposed cap end and the upstream side of the first element may face the internal volume. The second element may be disposed on the downstream side of the first element such that the second element is disposed about the particulate filter bag. The second element may include a mercury adsorptive material for use in removing mercury from the fluid stream. The second element may be removably disposed proximate to the first element (and/or first element may be removably disposed proximate to the second element) such that the second element may be serviced (e.g., regenerated, cleaned), reused or replaced independent from the service, reuse or replacement of the first element.

In an embodiment, the second element may include activated carbon fibers created from at least one of novolac and novoloid fibers. In an embodiment, the mercury adsorptive material of the second element may include activated carbon particles adhered to a support material of the second element by a polymer adhesive.

In a related aspect, one or more of the above-stated objectives may be achieved by a provided method that includes providing a filter system, placing the filter system in a fluid stream, directing the fluid stream into an interior of a particulate filter bag of the filter system through an open end of the particulate filter bag, then passing the fluid stream through the particulate filter bag to remove particles from the fluid stream, and then flowing the fluid stream through a downstream element of the filter system wherein the fluid stream contacts carbon contained in the downstream element to remove mercury from the fluid stream. The particulate filter bag may be positioned in an upstream position relative to the downstream element to protect the downstream element from particulates suspended in the fluid stream. The carbon may be in the form of activated carbon fibers created from at least one of novolac and novoloid fibers. The carbon may be in the form of activated carbon particles adhered to a support material of the downstream element by a polymer adhesive. The downstream element may be removably disposed proximate to the upstream element (and/or the upstream element may be removably disposed proximate to the downstream element) such that the downstream element may be serviced, reused or replaced independent from the service, reuse or replacement of the upstream element.

In yet another aspect, one or more of the above-stated objectives may be achieved by a provided method of filtering a pollutant-laden fluid stream in a filtration system that includes interconnecting a first end of a filter apparatus to an opening in a tube sheet of the filtration system. The filter apparatus may include a particulate filter bag and a sleeve. The sleeve may be removably disposed adjacent to a first surface of the particulate filter bag. The particulate filter bag may define an internal volume between the first end and an oppositely disposed cap end. The particulate filter bag may be oriented in an upstream position relative to the sleeve to protect the sleeve from particulates suspended in the fluid stream. The method may further include the steps of passing the fluid stream through the particulate filter bag after the interconnecting step, collecting particulates from the fluid stream during the passing step with the particulate filter bag and flowing the fluid stream through the sleeve after the passing step. Furthermore, the method may include remediating pollutants from the fluid stream by contacting the fluid stream to the sleeve while the fluid stream is flowing through the sleeve. The method may further include suspending the flowing step, removing the sleeve from the filtration system while the flow is suspended and then regenerating the sleeve. After regeneration, the sleeve may be reused in the filtration system or reused in another filtration system.

In an embodiment, the method may further comprise repeating the suspending, removing and regenerating steps a plurality of times. In an embodiment, the particulate filter bag may comprise ePTFE.

In an arrangement, the first surface of the particulate filter bag may be an external surface of the particulate filter bag and the sleeve may be removably disposed about the particulate filter bag. In such an arrangement, the fluid stream may flow into the internal volume through the first end, then through the particulate filter bag, and then through the sleeve. In an alternate arrangement, the first surface of the particulate filter bag may be an internal surface of the particulate filter bag and the sleeve may be removably disposed within the internal volume of the particulate filter bag. In such an arrangement, the fluid stream may flow through the particulate filter bag, then through the sleeve into the internal volume, and then through the first end.

The method may further include the steps of replacing the sleeve into the filtration system during the suspending step and after the regenerating step and resuming the flowing step after the replacing step. Alternatively, the removing step may further include separating the sleeve from the particulate filter bag and, during the suspending step, positioning a replacement sleeve adjacent to the particulate filter bag and resuming the flowing step with the particulate filter bag and the replacement sleeve installed in the air filtration system.

In an embodiment, the regenerating step may include placing the sleeve in an oven and exposing the sleeve to a desorb temperature that is elevated relative to a temperature of the fluid stream. The desorb temperature may be at least about 30 degrees C. above the temperature of the fluid stream (e.g., a mean temperature of the fluid stream). The desorb temperature may be at least 180 degrees C. The exposure of the sleeve to the desorb temperature may have a duration of at least 60 minutes. The remediating step may comprise removing mercury from the fluid stream and the regenerating step may comprise desorbing mercury from the sleeve.

In still another aspect, one or more of the above-stated objectives may be achieved by a provided method of filtering in a filtration system that includes orienting a filter apparatus relative to a pollutant-laden fluid stream such that a first layer of the filter apparatus is disposed in an upstream position and a second layer of the filter apparatus is disposed in a downstream position. The method further includes passing the fluid stream through the first layer, collecting particulates from the fluid stream during the passing step with the first layer, flowing the fluid stream through the second layer after the passing step, and remediating pollutants from the fluid stream by contacting the fluid stream to the second layer during the flowing step. The method may further include suspending the flowing step, removing the second layer from the filtration system during the suspending step, and regenerating the second layer after the removing step. After regeneration, the second layer may be reused in the filtration system or reused in another filtration system.

In an embodiment, the method may further include replacing the second layer into the filtration system during the suspending step and after the regenerating step and resuming the flowing step after the replacing step. In an alternate embodiment, the method may further include positioning a replacement second layer downstream of the first layer and resuming the flowing step with the first layer and the replacement second layer installed in the air filtration system.

In an embodiment, the orienting, passing, collecting, flowing, and remediating steps may occur at a first facility and the regenerating step may occur at a second facility. The first facility may be remote from the second facility. The method may further include shipping the second layer from the first facility to the second facility prior to the regenerating step and shipping the second layer from the second facility to the first facility after the regenerating step. For example, an industrial plant utilizing the filtration system may suspend the filtering process, remove the second layer and ship it to an off-site service facility where the second layer may be regenerated. After regeneration, the second layer may be shipped back to the industrial plant and installed into the filtration system.

The regeneration step may comprise placing the second layer in an oven and exposing the second layer to a desorb temperature that is elevated relative to a temperature of the fluid stream. The regeneration step may further include capturing mercury desorbed from the second layer during the regenerating step and disposing of the captured mercury.

In an aspect, one or more of the above-stated objectives may be achieved by a provided method of servicing a filter apparatus of a pollutant-laden fluid stream filtration system that includes accessing the filter apparatus of the filtration system. The filter apparatus may include a first sleeve removably disposed adjacent to a surface of a particulate filter bag. The method may include separating the first sleeve from the filter apparatus, regenerating a second sleeve, and installing, after the removing step, the regenerated second sleeve into the filter apparatus.

The accessing and installing steps may occur at a first facility and the regenerating step may occur at a second facility. The first facility may be remote from the second facility. In this regard, the method may include shipping the sleeve from the first facility to the second facility prior to the regenerating step and shipping the sleeve from the second facility to the first facility after the regenerating step. The first sleeve and the second sleeve may be the same sleeve or the first sleeve and the second sleeve may each be a unique sleeve.

In another aspect, one or more of the above-stated objectives may be achieved by a provided method of servicing a pollutant-laden fluid stream filtration system that includes receiving a first sleeve that includes adsorbed pollutants from a customer, regenerating a second sleeve, and shipping the regenerated second sleeve to the customer to replace the first sleeve. In the present aspect, the first and second sleeves may each be operable to be removably disposed adjacent to a surface of a particulate filter bag of the filtration system. In an embodiment, the adsorbed pollutants may include mercury. The first sleeve and the second sleeve may be the same sleeve or the first sleeve and the second sleeve may each be a unique sleeve. The first and second sleeves may each comprise activated carbon in the form of fibers created from novolac and/or novoloid fibers.

In yet another aspect, one or more of the above-stated objectives may be achieved by a provided filter apparatus for use in an air filtration system that includes a particulate filter bag and a sleeve. The particulate filter bag may have a first end for operative interconnection to a tube sheet of a filtration system. The particulate filter bag may define an internal volume between the first end and an oppositely disposed cap end. Furthermore, the particulate filter bag may have an upstream surface and a downstream surface. The sleeve may be removably disposed adjacent to the downstream surface of the particulate filter bag. The sleeve may be regenerable.

In an embodiment, the particulate filter bag may comprise ePTFE. In an embodiment, the sleeve may comprise activated carbon fibers created from at least one of novolac and novoloid fibers.

In an arrangement, the sleeve may be operable to adsorb mercury from the pollutant-laden fluid stream, then desorb mercury when exposed to a desorb temperature that is elevated relative to a temperature of the fluid stream, then re-adsorb mercury during subsequent exposure to the pollutant-laden fluid stream.

The various methods discussed above may be performed manually, automatically, or through a combination thereof. Moreover, the initiation of the performance of any of the methods may be achieved in an automated fashion, manually, or through a combination of automated and manual actions. Similarly, the apparatuses discussed above may be operable to function automatically and/or manually.

The various features, arrangements and embodiments discussed above in relation to each aforementioned aspect may be utilized by any of the aforementioned aspects. Additional aspects and corresponding advantages will be apparent to those skilled in the art upon consideration of the further description that follows.

DETAILED DESCRIPTION

Figure 1:
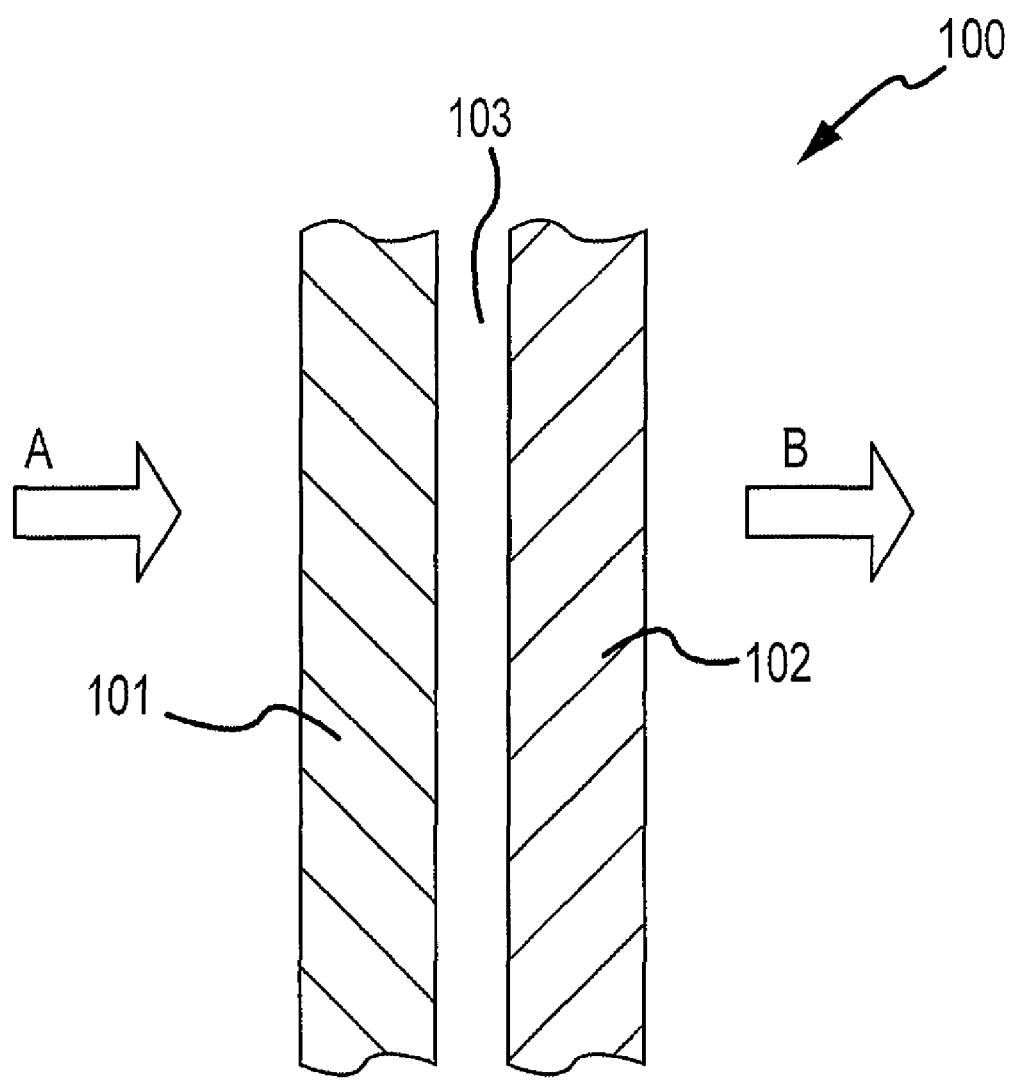
FIG. 1 is a schematic diagram of a cross section of an embodiment of an air pollution control filter element for a filtration system.

FIG. 1 is a schematic diagram of a cross section of an embodiment of an air pollution control filter element 100 for a filtration system. The air pollution control filter element 100 may include two portions, an upstream element 101 and a downstream element 102. There may be a gap 103 between the upstream element 101 and the downstream element 102 such as shown in FIG. 1. In other embodiments, the upstream element 101 and the downstream element 102 may be positioned so that they are touching each other along at least a portion of the air pollution control filter element 100.

The upstream element 101 and the downstream element 102 may be separable from each other. For example, the downstream element 102 may be operable to be removed from the air pollution control filter element 100. After removal, the downstream element 102 may be operable to be installed adjacent to a replacement upstream element 101. Similarly, the upstream element 101 may be operable to be removed from the air pollution control filter element 100 and subsequently installed adjacent to a replacement downstream element 102. Moreover, the downstream element 102 may be operable to be serviced after it has been removed from the air pollution control filter element 100. After servicing (described below), the downstream element 102 may be installed back into the air pollution control filter element 100 adjacent to the upstream element 101.

The air pollution control filter element 100 may be operable to remove pollutants from a pollutant-laden fluid stream A. The pollutant-laden fluid stream A may be a stream of pollutant-laden gasses from an industrial process. For example, the pollutant-laden fluid stream A may be a stream of combustion flue gasses; for instance from a metal production facility.

The pollutant-laden fluid stream A may contain, inter alia, particulate and chemical pollutants. For example, the pollutant-laden fluid stream A may contain ash particulates. The pollutant-laden fluid stream A may contain pollutants such as dioxin, furans, mercury and/or $NO_x$. In particular, mercury may be present in the pollutant-laden fluid stream A.

The upstream element 101 of the air pollution control filter element 100 may generally be configured to remove particulates of a predeterminable size from the pollutant-laden fluid stream A. For example, in one configuration, the upstream element 101 may have an air permeability greater than 2 cfm/ft$^2$ measured at a differential pressure of 0.5 inches water gauge and a filtration efficiency greater than 80% at 0.3 microns (5.3 cm/s). The upstream element 101 may comprise a single layer or it may comprise one or more sub-layers. For example, the upstream element 101 may comprise an ePTFE membrane laminated to a fiberglass backing. The ePTFE membrane may be positioned on the upstream side of the upstream element 101 (the left side of the upstream element 101 as shown in FIG. 1) while the fiberglass backing may be situated on the downstream side of the upstream element 101 (the right side of the upstream element 101 as shown in FIG. 1). In such a system, the fiberglass backing may generally serve as a support for the ePTFE membrane. During filtration, particulates may generally form a dust cake on the upstream surface of the ePTFE membrane. This dust cake may be removed by cleaning processes, such as used in reverse air filtration systems described below.

The downstream element 102 may generally be configured to remove additional pollutants, such as chemicals, from the pollutant-laden fluid stream A. The downstream element 102 may be configured for specific pollutants.

The downstream element 102 may contain binding agents to trap pollutants and/or catalytic agents operable to break down or transform pollutants into a more desirable state. The downstream element 102 may include catalysts designed to react with specific pollutants. The downstream element may contain catalytic materials such as noble metals, transition metal oxides, as well as alkali and alkaline earth metals, their oxides and carbonates. Preferred catalysts may include particles such as titania, alumina, silica, and zeolites which have high surface areas thereon selected from noble metals (e.g., Pt, Pd, Au, Ag, Ir, and Rh including compounds thereof), vanadia, and/or transition metals (e.g., Fe, Cu, and Al, including compounds thereof). A particularly preferred catalyst comprises $V_2O_5$ on the anatase form of titanium dioxide. The downstream element may be in the form of a catalytic fabric and/or catalytic felt.

The downstream element 102 may contain adsorptive components to adsorb pollutants and thereby remove them from the pollutant-laden fluid stream A. For example, the downstream element 102 may include activated carbon. The activated carbon may be in the form of fibers created from novolac and/or novoloid fibers. In this regard the downstream element itself may be constructed from adsorptive material. Novolac and novoloid fibers are cross-linked, three-dimensional, phenolic-aldehyde fibers. These fibers can be activated using known techniques to produce activated carbon fibers. An exemplary process of novolac/novoloid carbon fiber activation can be found in U.S. Pat. No. 4,076,692 to Batha et al. Such activated carbon fibers, available under the trademark Kynol™, are particularly effective at adsorbing mercury from a gas stream.

In another example, adsorptive components in the form of adsorptive particulates may be included within the downstream element 102. Particularly, the downstream element 102 may include adsorptive particles that are adhered to a porous woven or non-woven substrate of the downstream element 102 by a polymer adhesive, and optionally adjacent or within the substrate is at least one protective microporous layer. In a particular arrangement, the porous substrate comprises woven or non-woven ePTFE fibers. As used herein, the term "polymer adhesive" shall include at least one thermoplastic elastomer in the form of solid particles suspended in a liquid that is capable of forming strings and dispersion primary particles which tether the adsorptive particles to the substrate, as well as the resulting fixed form of the polymer adhesive. Suitable polymer adhesives include PTFE, fluoroethylene propylene, high molecular weight polyethylene (i.e., where the molecular weight is 1 million or greater), high molecular weight polypropylene (i.e., where the molecular weight is 1 million or greater), perfluoroacrylate, polyvinylidene fluoride, a terpolymer of tetrafluoroethylene, hexafluoropropylene and vinylidene fluoride and polychloro trifluoro ethylene. The adsorptive particles may include activated carbon particles. U.S. Pat. No. 6,331,351 to Waters et al., which is incorporated herein by reference in its entirety, describes the manufacture and configuration of filter materials containing particles that are adhered to a porous woven or non-woven substrate using a polymer adhesive.

In an arrangement, the catalytic agents discussed above may be adhered to a porous woven or non-woven substrate using a polymer adhesive in a similar manner to as described with respect to the adsorptive particles. In an arrangement, both adsorptive and catalytic particles may be adhered to the substrate using a polymer adhesive.

The upstream element 101 and the downstream element 102 may have life cycle durations different from each other. For example, the downstream element 102 may be a catalytic felt and, by virtue of its position downstream of the upstream element 101, may perform little or no particulate filtering. Accordingly, the life cycle of the downstream element 102 may be based on the life cycle of the catalytic material within the downstream element 102 and consequently may have a useful life that is several times longer than the typical particulate filter used in the upstream element 101. Furthermore, the downstream element 102 may be significantly more expensive to produce than the upstream element 101.

In an embodiment, the downstream element 102 may be permanently interconnected to the upstream element 101. Alternatively, the downstream element 102 may be removably disposed relative to the upstream element 101. It may be beneficial to have the downstream element 102 removably disposed relative to the upstream element 101 so that the useful life cycles of the upstream element 101 and the downstream element 102 can be decoupled. Once decoupled, each individual element can be configured to maximize the overall efficiency and reduce the overall costs of operation of the air pollution control filter element 100.

In particular, for example, where the downstream element 102 is significantly more expensive than the upstream element 101, the upstream element 101 may be configured to maximize the life span of the more expensive downstream element 102. For instance, this may be achieved by configuring the upstream element 101 so that it has a particulate filtration efficiency that results in little or no particulates capable of reducing the effectiveness of the downstream element 102 from reaching the downstream element 102. In this regard, the downstream element 102 may have a service life equal to the useful life of the catalytic or adsorbent properties of the downstream element 102. Such a particular filtration efficiency of the upstream element 101 may be greater than required by pollution control regulations, but may still be beneficial with respect to the operating costs of the air pollution control filter element 100 due to the increased life of the downstream element 102, which as noted may be more expensive than the upstream element 101. In this regard, when the upstream element 101 has completed its useful life, it may be decoupled from the downstream element 102 and replaced independently of the downstream element 102. Accordingly, an ePTFE layer laminated onto an upstream side of the upstream element 101 may be beneficial since its filtration efficiency may be chosen such that the upstream element 101 filters particulates such that the operational life of the downstream element 102 is not limited by clogging and/or particle accumulation, but only limited by the life cycle of the catalytic or adsorbent components.

The downstream element 102 may be regenerable (e.g., operable to be regenerated through a regeneration process). As used herein, a "regeneration process" is a process whereby catalytic activity or adsorptive capacity of an air pollution control element, such as the downstream element 102, is at least partially restored. In the case where adsorptive capacity is at least partially restored, the regeneration process may result in pollutants disassociating from the air pollution control element. Such disassociation may take the form of pollutants desorbing from the air pollution control element. Such disassociating may be achieved through exposure to heated gas at a temperature higher than the operating temperature of the air pollution control element. Such a regeneration process may result in the air pollution control element being restored such that it possesses at least about fifty percent of its original pollutant adsorption capability.

The regeneration process may include collecting disassociated pollutants. For example, pollutants may be desorbed from the air pollution control element during exposure to heated gas and these pollutants may be collected (e.g., by a filter coupled to an oven used to expose the air pollution control element to the heated gas) and handled (e.g., disposed) separately from the air pollution control element. In this regard, pollutants may be collected (e.g., adsorbed by the air pollution control element) at a first facility (e.g., where the filtration system is located), transported to a second facility (e.g., where the desorption oven is located) while associated with the air pollution control element, and then at least a portion of the pollutants may then be desorbed and collected at the second facility for disposal.

The down stream element 102 may be decoupled from the upstream element 101 and put through a regeneration process. The regeneration process may include placing the downstream element 102 into an oven at a predetermined temperature and for a predetermined duration such that adsorbed pollutants are desorbed from the downstream element 102.

The following experiment was conducted to quantify the mercury adsorption and desorption capabilities of the fabric of activated carbon made from novolac fibers. The experiment utilized ⅝" diameter samples of fabric of activated carbon made from novolac fibers. The samples were exposed to mercury vapor for 24 hours in a gas stream containing $N_2$, air and $SO_2$. The total gas flow through the sample was 211 cubic centimeters per minute (cc/min). Flow control was maintained at 130 cc/min of nitrogen, 80 cc/min of air and 1 cc/min of $SO_2$. Mercury vapor was released into the gas stream from permeation tubes located in a 76° C. water bath. The sample was heated to 150° C. during exposure in a tube furnace. Mercury level was measured using continuous monitoring with a mercury spectrometer to verify exposure amount. At various stages, samples were measured with the spectrometer to determine adsorbed mercury levels. Since such determinations required destruction of the samples, the experiment was begun and conducted with multiple samples undergoing the same conditions and individual samples were destructively tested at various stages of the experiment. After the first 24-hour exposure to the mercury vapor, a first sample was measured with the spectrometer and found to contain 12,358 parts per million (ppm) of mercury. The remaining samples were then desorbed in an oven at 300° C. for 2 hours in air. A second sample was measured with the spectrometer and found to contain 731 ppm of mercury. The remaining samples were then re-exposed for 24 hours in the same manner as the original exposure. A third sample was then analyzed using the spectrometer and was found to contain 11,016 ppm of mercury.

Figure 2A:
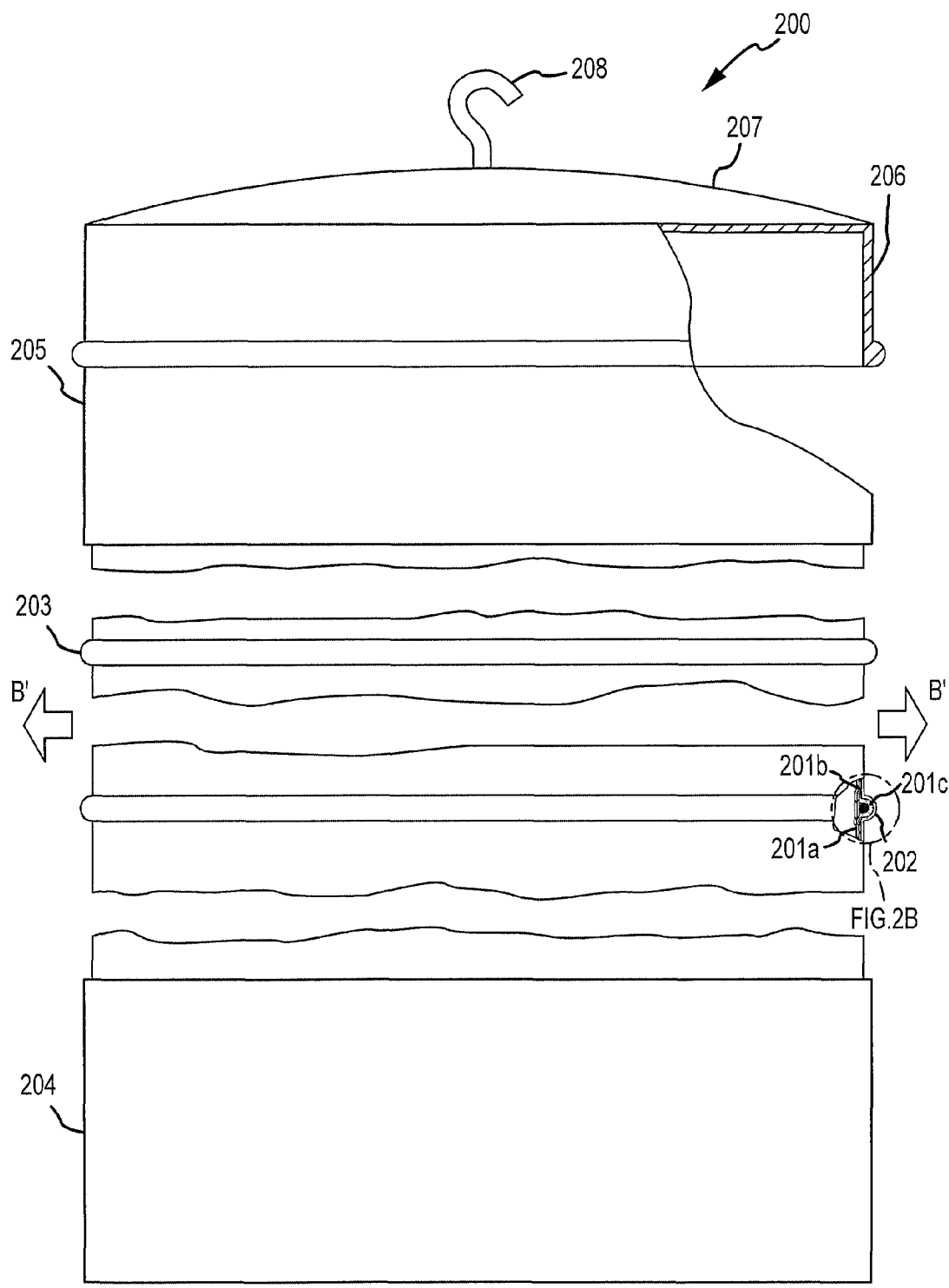
FIG. 2A is a partial sectional view of an embodiment of an air pollution control filter element for a filtration system.

FIG. 2A is a partial sectional view of an embodiment of an air pollution control filter element 200 for a reverse air filtration system. The air pollution control filter element 200 is generally in the form of a thin-walled cylinder. The bottom end of the cylinder is operable to be functionally connected to a pollutant-laden fluid stream A'. The pollutant-laden fluid stream A' may flow into the interior portion of the air pollution control filter element 200 and then flow outwardly through the walls of the cylinder to filter the pollutant-laden fluid stream A' thereby producing filtered fluid stream B'. The pollutant-laden fluid stream A' may flow from the cylinder as illustrated in FIG. 2A. The top end of the cylinder may include a cap 207 used to support the air pollution control filter element 200 and prevent fluid stream flow therethrough.

Figure 2B:
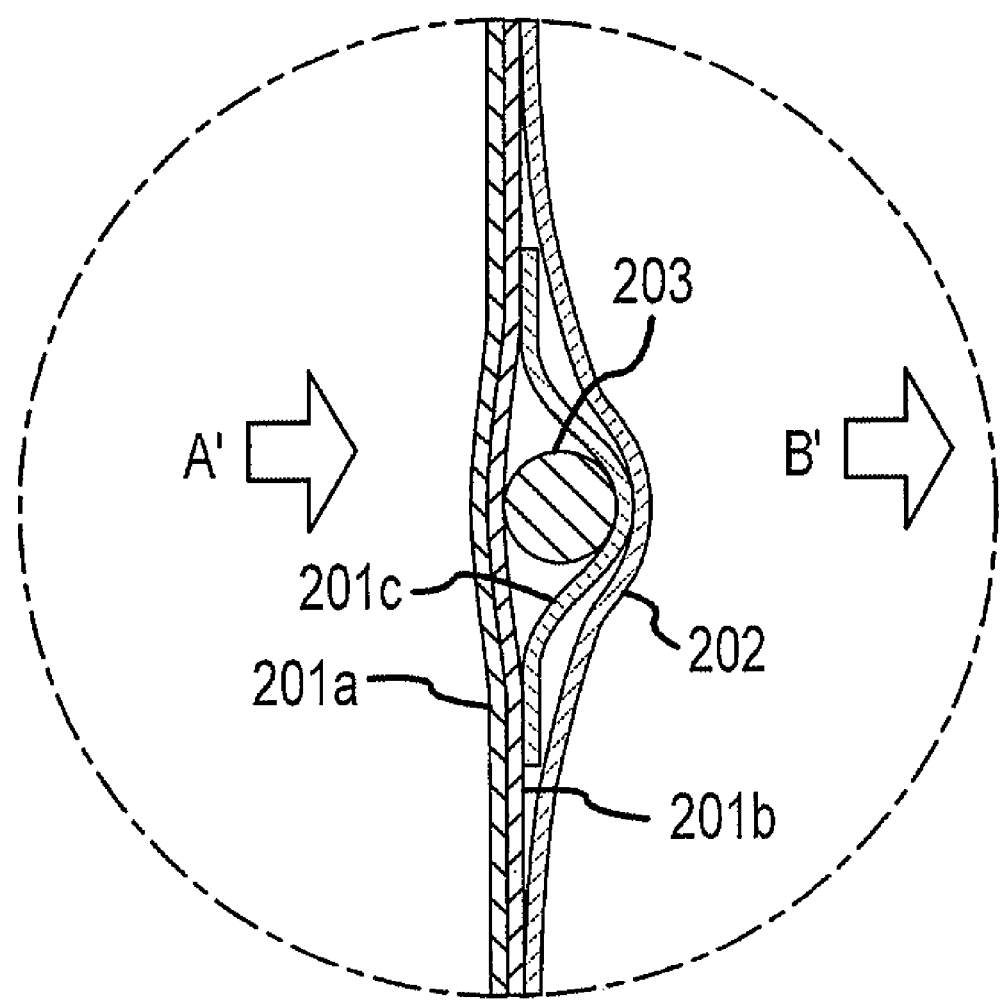
FIG. 2B is a cross sectional view of a section of the embodiment of an air pollution control filter element of FIG. 2A.

FIG. 2B is a cross sectional view of a section of the air pollution control filter element 200 of FIG. 2A. As illustrated in FIG. 2B, the pollutant-laden fluid stream A' flows from the interior of the cylinder (situated on the left side of FIG. 2B) through the layers of the air pollution control filter element 200, thereby removing pollutants, to the exterior of the cylinder (situated on the right side of FIG. 2B) where it emerges from the cylinder as a filtered fluid stream B'.

The layers of the air pollution control filter of 200 may be configured similar to as discussed above with a reference to the filter element 100 of FIG. 1. In this regard, an upstream element may comprise a first layer 201a and a second layer 201b. Together, first layer 201a and second layer 201b form upstream element 201. A downstream element 202 may be positioned downstream of upstream element 201. Functionally, the pollutant-laden fluid stream A' passes into the first layer 201a were particulates within the pollutant-laden fluid stream A' are filtered from the fluid stream. The first layer 201a may be an ePTFE layer of a predeterminable filtration efficiency. For example, the first layer 201a may have an air permeability greater than 2 cfm/ft$^2$ measured at a differential pressure of 0.5 inches water gauge and a filtration efficiency greater than 80% at 0.3 microns (5.3 cm/s). The first layer 201a may be supported by the second layer 201b. Second layer 201b may comprise a fiberglass fabric backing. The particulates filtered from the fluid stream may generally be deposited on the upstream surface of the first layer 201a.

After passing through the upstream element 201, the fluid stream and then pass through the downstream element 202. The downstream element 202 may be configured similar to as discussed above with reference to the downstream element 102 of FIG. 1. In this regard, the downstream element 202 may comprise catalytic components and/or adsorptive components such as those described with reference to downstream element 102.

The downstream element 202 may be separable from the upstream element 201. In this regard, the downstream element 202 and/or the upstream element 201 may each be individually replaceable.

Returning to FIG. 2A, the air pollution control filter element 200 may include a plurality of support members disclosed along the longitudinal axis of the air pollution control filter element 200. The support members may be in the form of support rings such as support ring 203. Support ring 203 may be in the form of a metal (or any other appropriate material) ring attached to the upstream element 201 of the air pollution control filter element 200. As illustrated in FIG. 2B, the support ring 203 may be fastened to the upstream element 201 by placing the support ring 203 between a reinforcing portion 201c and the second layer 201b. The reinforcing portion 201c may then be sewn to the second layer 201b such that the support ring 203 is held in place relative to the upstream element 201b. The reinforcing portion 201c may be constructed similarly to the upstream element 201. Thus the support ring 203, and other similarly configured support rings, may provide support to the to air pollution control filter element 200 to prevent the air pollution control filter element 200 from collapsing upon itself when the pressure on the outside of the filter element 200 is greater than the pressure on the inside of the filter element 200, such as during cleaning cycles.

Returning to FIG. 2A, the air pollution control filter element 200 may further include an abrasion resistant fabric cuff 204 disposed at the bottom of the air pollution control filter element 200. The cuff 204 may provide additional strength to the air pollution control filter element 200 where it interfaces with a tube sheet.

Figure 3:
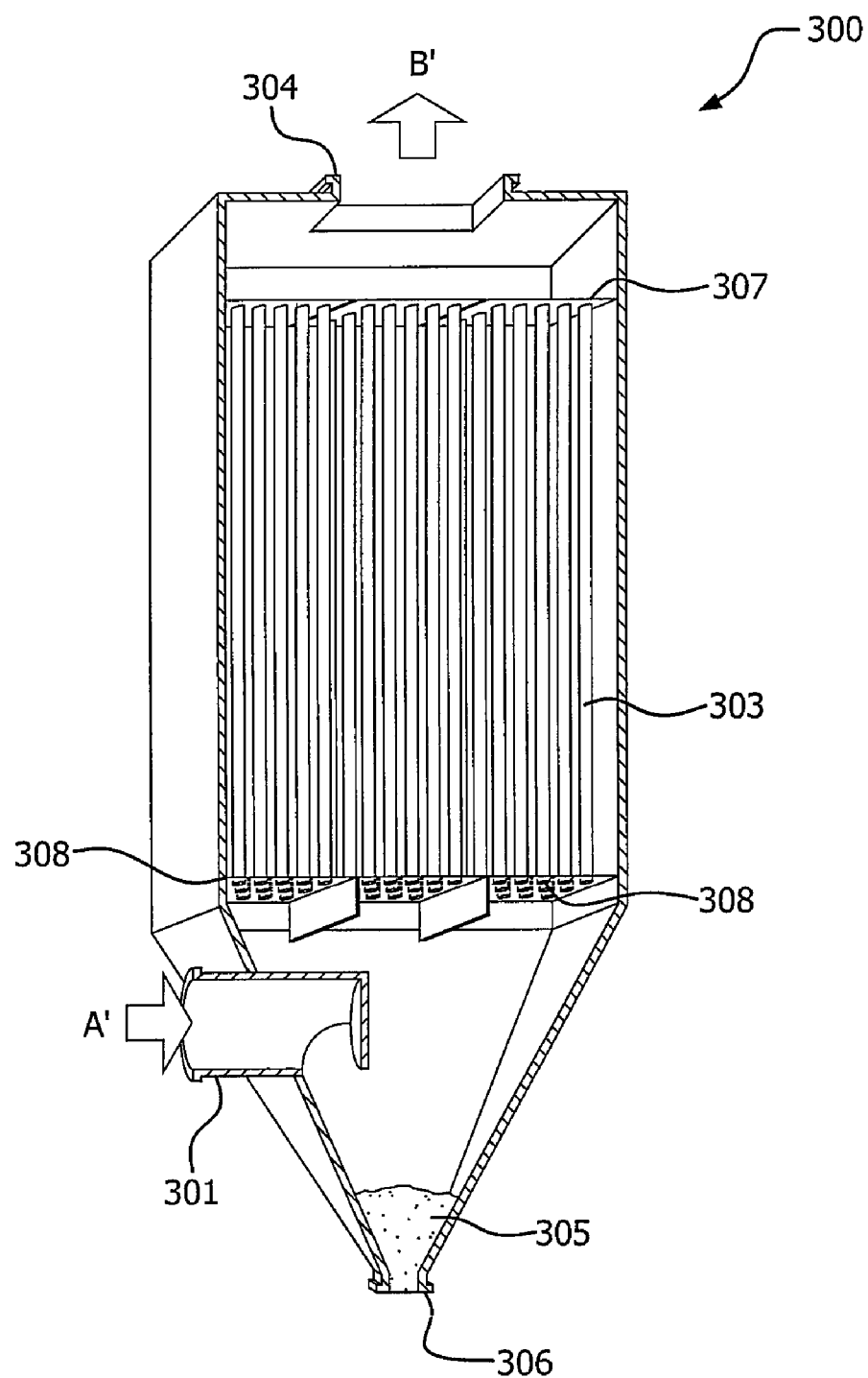
FIG. 3 is a schematic view of a baghouse for a filtration system that may incorporate the air pollution control filter element of FIG. 2.

A top portion 205 of the downstream element 202 may be operable to be interconnected to an attachment member 206 of the cap 207. Such an interconnection may be accomplished in any appropriate manner. For example, as shown in FIG. 2A, the attachment member 206 may be in the form of a circumferential ridge. The downstream element 202 may include a rigid band such as a metal band sewn into the top portion of the downstream element 202. The rigid band may be sized such that it has a smaller inside diameter than an outside diameter of the attachment member 206. Accordingly, the downstream element 202 may be draped over the entire length of the upstream element 201 and hung by the rigid band positioned just above the attachment member 206. Accordingly, the rigid band may be incapable of moving downward below the attachment member 206. The downstream element 202 may also be interconnected to the upstream element 201 in any appropriate manner along the bottom of the air pollution control filter element 200. For example, a securing clamp may be used to clamp both the upstream element 201 and the downstream element 202 to a through-hole of a tube sheet 302 (FIG. 3, described below).

The attachment member 206 may be interconnected to, or be a part of, the cap 207. A hanger 208 may be interconnected to the cap 207. In this regard, the entire air pollution control filter element 200 may be hung from the hanger 208.

As noted above, the downstream element 202 may be separable from the upstream element 201. This may allow for individual replacement of either the downstream element 202 or the upstream element 201. For example, and as described above, the downstream element 202 may have a significantly longer useful life than the upstream element 201 and therefore it may be desirable to replace the upstream element 201 while retaining the downstream element 202.

In an exemplary process to replace the upstream element 201, a first step may be to temporarily stop the flow of the pollutant-laden fluid stream A'. The next step may be to disconnect the air pollution control filter element 200 by unhooking it at the hanger 208 and disconnecting the air pollution control filter element 200 at the bottom from the tube sheet 302 (FIG. 3). Next, the downstream element 202 may be disconnected from the bottom of the upstream element 201 and slid off of the air pollution control filter element 200 by sliding it over the cap 207. Next, the upstream element 201 may be removed from the cap 207. A new upstream element 201 may then be interconnected to the cap 207. Next, the downstream element 202 may be slid over the cap 207 and the new upstream element 201 and then interconnected to the bottom of the new upstream element 201. The air pollution control filter element 200 may then be reinstalled and the flow of the pollutant-laden fluid stream A' may be restarted.

As previously noted, the air pollution control filter element 200 may be operable to be installed into a reverse airflow filtration system. An example of such a reverse airflow filtration system is illustrated in FIG. 3. The reverse airflow filtration system may comprise a baghouse 300 and a plurality of individual air pollution control filter elements 303. Each of the individual air pollution control filter elements may be configured similarly to the air pollution control filter element 200 of FIG. 2A. For illustrative purposes, only four air pollution control filter elements 303 are shown in FIG. 3. However in practice, a baghouse may contain dozens of individual air pollution control filter elements. The baghouse 300 may include an inlet 301 through which may be supplied the pollutant-laden fluid stream A'. The fluid stream may pass through the baghouse 300 and emerge as a filtered fluid stream B' through an outlet 304 at the top of the baghouse 300.

The baghouse 300 may be used to filter pollutants from pollutant-laden fluid streams produced from a variety of industrial processes. Such fluid streams may be in the form of combustion flue gases from metal production processes. The fluid streams from other manufacturing and/or chemical processor may also be filtered through the baghouse 300.

Air pollution control filter elements 303 may be installed within the baghouse 300. In such an installation, each of the air pollution control filter elements 303 may be hooked to a support member 307 of the baghouse 300. The support member 307 may take any appropriate form. For example, the support member may be in the form of a grid of attachment points enabling a plurality of air pollution control filter elements 303 to be positioned in a grid pattern. The bottom ends of the air pollution control filter elements 303 may be interconnected to a tube sheet 302 of the baghouse 300. The tube sheet 302 may include a plurality of orifices 308 that direct the pollutant-laden fluid stream A' into each of the individual air pollution control filter elements 303. The tube sheet 302 may also include structure to individually secure each of the air pollution control filter elements 303 so that substantially none of the pollutant-laden fluid stream A' may bypass the air pollution control the filter elements 303.

In operation, the pollutant-laden fluid stream A' may be directed through the inlet 301 and into the interior portions of each of the air pollution control filter elements 303. Over time particulates may collect on the inner surface of each of the air pollution control filter elements 303. From time to time, it may be desirable to remove the collected particulates. This may be achieved by a reverse air cleaning cycle. The reverse air cleaning cycle may include a brief halt to the flow of the pollutant-laden fluid stream A' into the baghouse 300. While the flow is suspended, a reverse flow through the baghouse 300 may be initiated such that air is introduced into the baghouse 300 through the outlet 304, and through the side walls of each of the air pollution control filter elements 303. This reverse flow may dislodge particulates that have collected on the inner surface of each of the air pollution control filter elements 303. Dislodged particulates may fall along the length of each of the air pollution control filter elements 303 into a collection member 305 situated below the tube sheet 302. The collection member 305 may include an opening 306 through which the dislodged particulates may be removed from the baghouse 300. After a satisfactory amount of particulates have been dislodged from the air pollution control filter elements 303, the reverse airflow can be halted and regular filtration operations may be resumed.

The configuration of the air pollution control filter element 200 of FIGS. 2A and 2B, as used in a reverse air baghouse such as the reverse air baghouse 300 of FIG. 3, may be operable to accommodate a downstream element 202 that is significantly less strong than the upstream element 201. In this regard, the upstream element 201 may provide support for the downstream element 202. For example, during filtration, the majority of pressure drop across the air pollution control filter element 200 may occur across the upstream element 201 where particulate filtration occurs. In contrast, the downstream element 202 may have a relatively high permeability compared to the upstream element 201. Accordingly, little pressure drop may occur across the downstream element 202. Consequently, relatively little force (as compared to the upstream element 201) from the flow of the pollutant-laden fluid stream A' may be transmitted to the downstream element 202.

During cleaning cycles where the direction of the fluid stream is reversed, the reverse flow may cause the downstream element 202 to be pressed against the upstream element 201. In such circumstances, the upstream element 201 may provide mechanical support for the downstream element 202 by providing a backing for the downstream element 202. In contrast, the upstream element 201, due to the significant pressure drop across it, must be strong enough to withstand the forces of the pollutant-laden fluid stream A' during normal flow as it passes therethrough and the forces from the reverse flow during cleaning.

Figure 4:
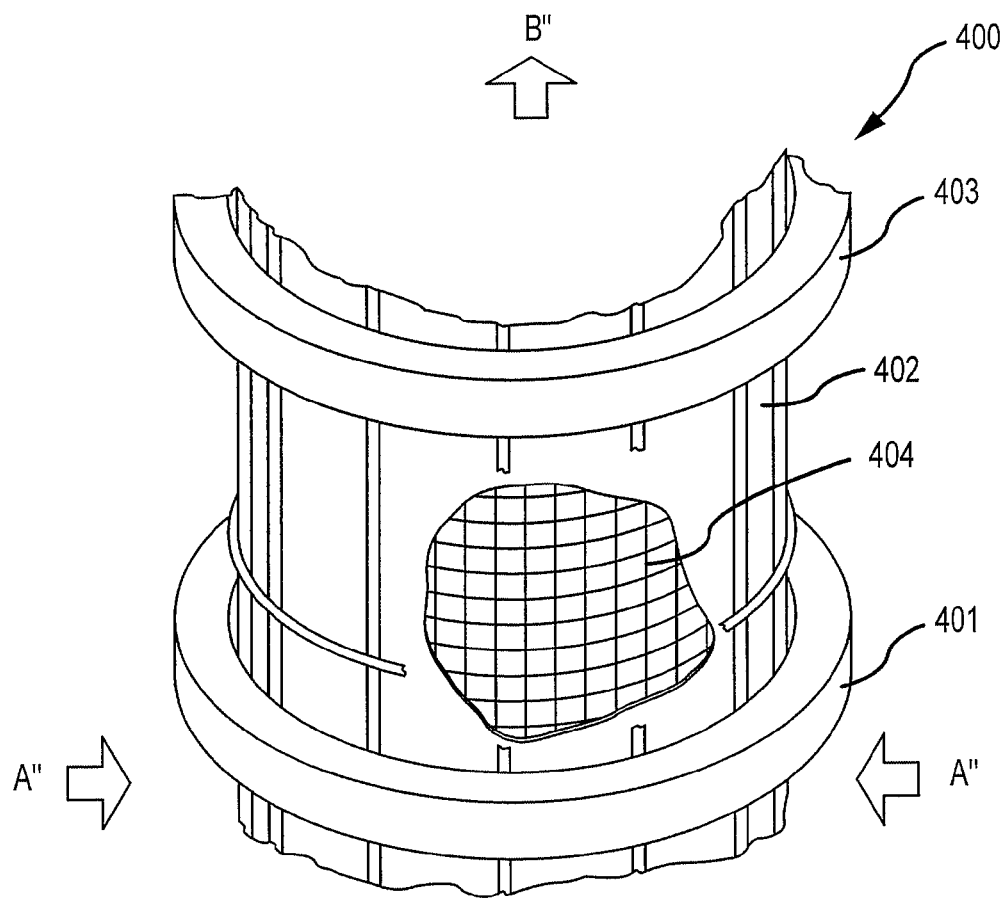
FIG. 4 is a schematic view of an embodiment of an air pollution control filter element for a filtration system.

Another embodiment of an air pollution control filter element 400 is illustrated in FIG. 4. The air pollution control filter element 400 may be used in a baghouse that incorporates a pulse jet element cleaning system. For air pollution control filter element 400, the pollutant-laden fluid stream A" enters the air pollution control filter element 400 through the side walls through an upstream element 401. The upstream element may be configured to filter particulates from the pollutant-laden fluid stream A" to a predetermined level of filtration efficiency. The upstream element 401 may, for example, comprise an ePTFE layer laminated to a fiberglass backing. The ePTFE layer may be disposed on the outer surface (as shown in FIG. 4) of the upstream element 401. The upstream element 401 may be kept from collapsing by an upstream element support cage 403. The fluid stream may then pass through a downstream element 402. The downstream element 402 may be a catalytic and/or adsorptive layer. For example, the downstream element 402 may comprise activated carbon fibers created from novoloid and/or novolac fibers, such as available under the trademark Kynol™. The downstream element 402 may be kept from collapsing by a downstream element support cage 404. After passing through the downstream element 402, the fluid stream has been filtered and may exit the air pollution control filter element 400 through an opening at the top of the air pollution control filter element 400. The other (bottom) end of the air pollution control filter element 400 may be capped so that all airflow into the interior of the air pollution control filter element 400 must pass through the upstream element 401 and the downstream element 402.

In operation, particulate may form a dust cake on the outside of the air pollution control filter element 400. To remove the dust cake, a fluid pulse (e.g., a pulse of compressed air from a jet positioned above an open top end of the pollution control filter element 400) may be directed down into the bag from the open top (in a direction opposite to the fluid flow illustrated in FIG. 4). This pulse may expand and shake the upstream element 401, loosening the dust cake and thus causing particulate to fall away from the upstream element 401.

The upstream element 401 and downstream element 402 may be independently replaceable. For example, once the useful life of the upstream element 401 has been completed, the upstream element 401 may be removed from the air pollution control filter element 400 by sliding it off of the upstream element support cage 403. A new upstream element 401 may then be slid over the upstream element support cage 403 and the entire air pollution control filter element 400 may then be placed back into service. Similarly, the downstream element 402 may be replaced by removing the downstream element support cage 404 and the downstream element 402, installing a new downstream element 402 around the downstream element support cage 404 and inserting the new downstream element 402 and downstream element support cage 404 back into the air pollution control filter element 400.

The configuration of the air pollution control filter element 400 of FIG. 4, as used in a pulse jet filtration system, may be operable to accommodate a downstream element 402 that is significantly less strong than the upstream element 401. During normal filtration, the downstream element 402 may be supported by the downstream element support cage 404, thus preventing the downstream element 402 from collapsing. During pulse jet cleaning, the downstream element support cage 404 and the upstream element support cage 403 may hold the downstream element 402 in place and the high permeability of the downstream element 402 may result in relatively little force from the cleaning pulse of the pulse jet cleaning cycle being transmitted to the downstream element 402. In this regard, the cleaning pulse may be operable to substantially pass through the downstream element 402 and interact with the upstream element 401 to eject dust cake that may have collected on the upstream surface of the upstream element 401. In contrast, the upstream element 401, due to the significant pressure drop across it, must be strong enough to withstand the forces of the pollutant-laden fluid stream A" as it passes therethrough and the forces from cleaning pulses.

The upstream element support cage 403 may be fabricated from metal wires welded together to form a cylindrical grid. The size of the wires and grid size may be selected to enable the upstream element support cage 403 to prevent the upstream element 401 from collapsing during normal flow of the pollutant-laden fluid stream A". Other appropriate materials and construction methods may be utilized in the construction of the upstream element support cage 403. Similarly, the downstream element support cage 404 may be fabricated from metal wires welded together to form a cylindrical grid. The size of the wires and grid size may be selected to enable the downstream element support cage 404 to prevent the downstream element 402 from collapsing during normal flow of the pollutant-laden fluid stream A". Furthermore, the downstream element 402 may have a lower strength than the upstream element 401 and therefore may require a smaller grid size for the downstream element support cage 404 (relative to the upstream element support cage 403, as illustrated in FIG. 4) to provide enough support to the downstream element 402 so that it does not tear or rupture during normal flow of the pollutant-laden fluid stream A". Other appropriate materials and construction methods may be utilized in the construction of the downstream element support cage 404.

Figure 5A:
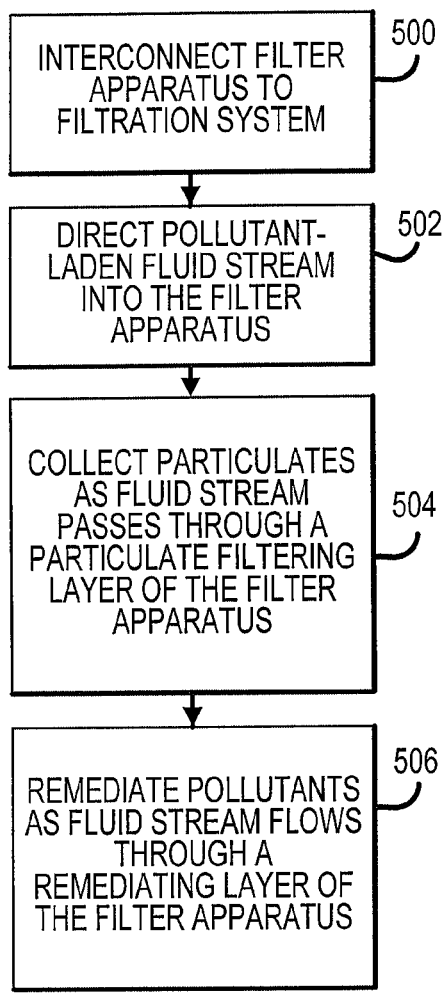
FIG. 5A is a flow chart of a method of filtering particulates and remediating pollutants of a pollutant-laden fluid stream.

FIG. 5A is a flow chart of a method of filtering particulates and remediating pollutants of a pollutant-laden fluid stream. The first step 500 in the method may be to interconnect a filter apparatus to a filtration system. The filter apparatus may be oriented such that a first layer of the filter apparatus is disposed in an upstream position (relative to the direction of the pollutant-laden fluid stream) and a second layer is disposed in a downstream position. The first layer may be a particulate filtering layer and the second layer may be a pollutant remediating layer. The interconnecting may take a variety of forms dependent on the type of filtration system.

For example, in a reverse air filtration system such as described above with reference to FIGS. 2A through 3, the interconnecting step may involve interconnecting an inlet end of the filter apparatus to an opening in a tube sheet. Such a filter apparatus may include a particulate filter bag and a sleeve removably disposed about the particulate filter bag. In such a system, the particulate filter bag is disposed upstream of the sleeve such that the fluid flow of the pollutant-laden fluid stream moves through the tube sheet, into the interior of the particulate filter bag, through the particulate filter bag, and then through the sleeve.

After the filter apparatus is interconnected to a filtration system, the next step 502 may be to direct the pollutant-laden fluid stream into the filter apparatus. As the fluid stream passes through the particulate filtering layer, the next step 504 may be to collect particulates from the fluid stream on the upstream surface of and/or within the particulate filtering layer. The next step 506 may be to remediate pollutants within the fluid stream as the fluid stream flows through the remediating layer. As discussed above, such remediation may take the form of adsorption of pollutants and/or catalytic reactions. As filtration may be a continuous process, steps 502, 504 and 506 may all occur simultaneously.

As the particulate filtering layer approaches or reaches a predetermined state, it may be desirable to replace the particulate filtering layer. Such a predetermined state may, for example, be determined by performance of the particulate filtering layer (e.g., exceeding a maximum pressure drop across the particulate filtering layer after cleaning), by time in service, and/or by any other appropriate means. For example, in a reverse air filtration system, the particulate filtering layer (in the form of the particulate filter bag) may accumulate particles such that the reverse air cleaning process is not able to restore the permeability of the particulate filtering layer to an acceptable level.

Figure 5B:
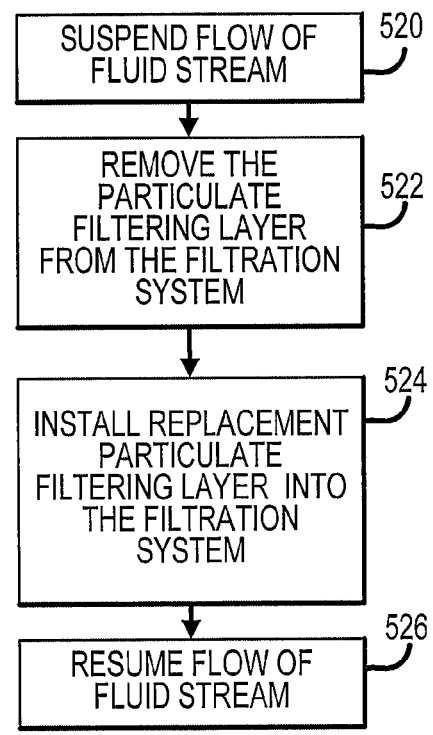
FIG. 5B is a flow chart of a method of replacing a particulate filtering layer of a filter apparatus.

FIG. 5B is a flow chart of a method of replacing a particulate filtering layer of a filter apparatus. The first step 520 of the method may be to suspend the flow of the pollutant-laden fluid stream. Once the flow is suspended, the next step 522 may be to remove the particulate filtering layer from the filtration system. For example, in a reverse air filtration system, step 522 may include removal of the entire filter apparatus from the baghouse and subsequently removing the sleeve from the particulate filter bag (the particulate filtering layer). In other filtration systems it may be desirable to remove the particulate filter layering while leaving the remediating layer in place.

After the particulate filtering layer has been removed, the next step 524 may be to install a replacement particulate filter layer into the filtration system. In the case of a reverse air filtration system, step 524 may take the form of first positioning the sleeve over the particulate filter bag and then installing the particulate filter bag with the sleeve thereon into the filtration system. Once the replacement particulate filtering layer has been installed into the filtration system, the next step 526 may be to resume the flow of the pollutant-laden fluid stream.

Figure 5C:
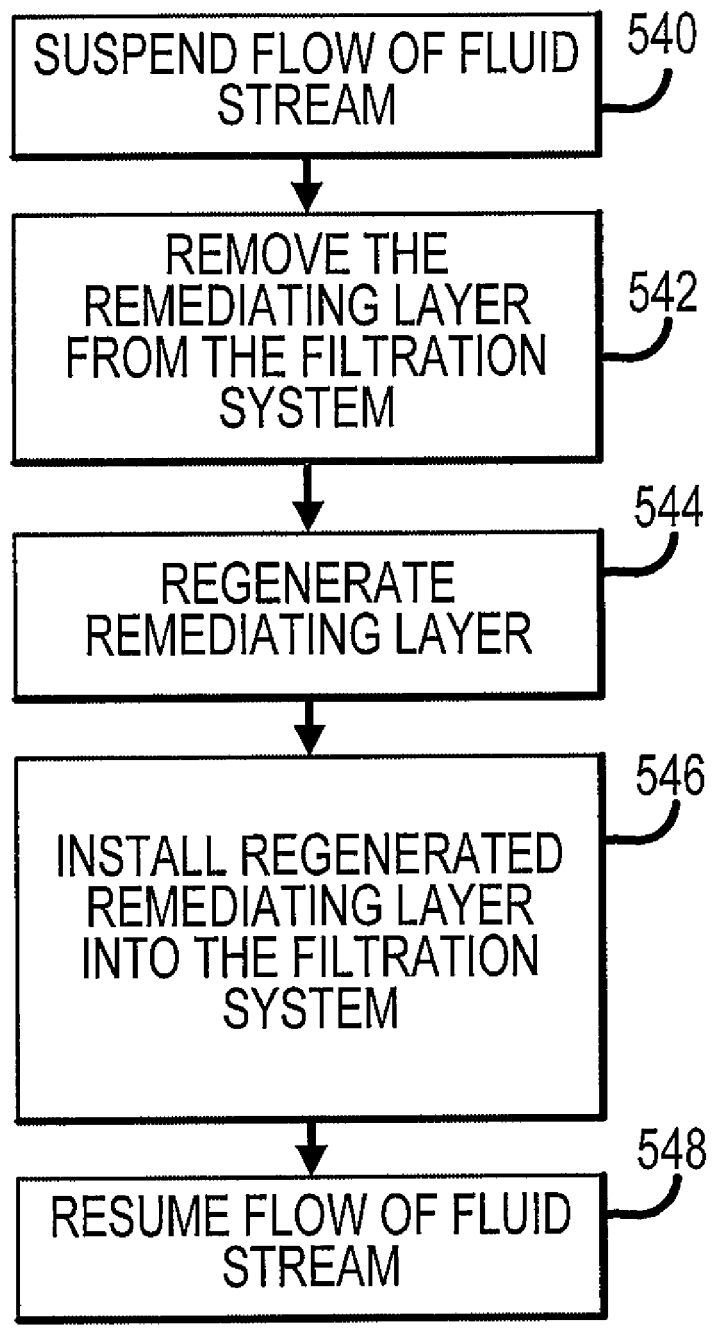
FIG. 5C is a flow chart of a method of regenerating a remediating layer of a filter apparatus.

FIG. 5C is a flow chart of a method of regenerating a remediating layer of a filter apparatus. The first step 540 of the method may be to suspend the flow of the pollutant-laden fluid stream. Once the flow is suspended, the next step 542 may be to remove the remediating layer from the filtration system. For example, in a reverse air filtration system, step 542 may include removal of the entire filter apparatus from the baghouse and subsequently removing the sleeve (the remediating layer) from the particulate filter bag. In other filtration systems it may be desirable to remove the remediating layer while leaving the particulate filtering layer in place.

After the remediating layer has been removed, the next step 544 may be to regenerate the remediating layer. The regeneration process may include exposing the remediating layer to an elevated temperature in a controlled environment. The exposure may be for a predetermined amount of time. The exposure may be performed until certain conditions are met. For example, the exposure may continue until the rate of desorption of a particular pollutant or a group of pollutants falls below a predetermined rate.

In an embodiment, the regenerating step may include placing the sleeve in an oven and exposing the sleeve to a desorb temperature that is elevated relative to a temperature (e.g., mean temperature) of the pollutant-laden fluid stream. The desorb temperature may be at least about 30 degrees C. above the temperature of the pollutant-laden fluid stream. The desorb temperature may be at least about 180 degrees C. The exposure of the sleeve to the desorb temperature may have a duration of at least about 60 minutes. The remediating step may comprise removing mercury from the fluid stream, and the regenerating step may comprise desorbing mercury from the sleeve. For example, where the remediating layer comprises adsorptive material comprising activated carbon fibers created from novolac and/or novoloid fibers, the regeneration process may include placing the remediating layer in a 180 degrees C. oven in the presence of air for 60 minutes.

After the remediating layer has been regenerated, the next step 546 may be to install the remediating layer into the filtration system. In the case of a reverse air filtration system, step 546 may take the form of first positioning the remediating layer in the form of a sleeve over a particulate filter bag and then installing the particulate filter bag with the sleeve thereon into the filtration system. Once the filter apparatus has been installed into the filtration system, the next step 528 may be to resume the flow of the pollutant-laden fluid stream.

The method of FIG. 5C may be repeated a plurality of times. In this regard, the remediating layer may be subjected to multiple cycles of adsorption, regeneration, and re-adsorption.

The above-described regeneration process involved removing, regenerating, and replacing a single remediating layer of a filtration system. In another embodiment, the process may be modified such that the remediating layer that is removed (a first remediating layer) is not the remediating layer that is installed. For example, to reduce equipment down time during remediating layer servicing, a previously regenerated remediating layer (a second remediating layer) may be used. In such a process, the second remediating layer may be installed immediately after the removal of the first remediating layer. The first remediating layer may then be regenerated and be made ready for a subsequent installation and reuse in the same filtration system or reuse in another filtration system.

Relatedly, a remediating-layer regeneration service provider may perform the regeneration step 544. For example, the remediating-layer regeneration service provider may provide replacement remediating layers to a customer (e.g., an operator of the filtration system). The customer may then replace existing remediating layers with the replacement remediating layers and send the used remediating layers to the remediating-layer regeneration service provider for regeneration. After regeneration, the regenerated remediating layers may be available for reuse by the original customer or other customers. The remediating-layer regeneration service provider may provide other services such as performing the removal and installation of the used and regenerated remediating layers.

The methods described above in relation to FIGS. 5B and 5C may be performed at different times from each other or they may be performed simultaneously with each other. In this regard, the particulate filtering layer may be replaced without servicing the remediating layer. Similarly, the remediating layer may be regenerated without servicing the particulate filtering layer. Finally, the particulate filtering layer may be replaced and the remediating layer may be regenerated as part of a single filtration system maintenance undertaking.

The foregoing description of embodiments has been presented for purposes of illustration and description. Furthermore, the description is not intended to limit the present invention to the forms disclosed herein. Consequently, variations and modifications commensurate with the above teachings, and skill and knowledge of the relevant art, are within the scope of the present invention as defined by the claims that follow.

What is claimed is:

1. A filter apparatus for use in a reverse air filtration system, said apparatus comprising:
a particulate filter bag, said particulate filter bag having an inlet end for operative interconnection to a pollutant-laden fluid stream, said particulate filter bag defining an internal volume between said inlet end and an oppositely disposed cap end, said particulate filter bag having an upstream surface facing said internal volume and a downstream surface facing away from said internal volume;
at least one support disposed along a longitudinal axis of said particulate filter bag for support to maintain said internal volume; the support comprising a plurality of rigid rings oriented perpendicular to said longitudinal axis, wherein said plurality of rigid rings are each interconnected to said particulate filter bag; and
a sleeve removably disposed about said particulate filter bag and said at least one support, said sleeve disposed on said downstream surface side of said particulate filter bag.

2. The filter apparatus of claim 1, wherein said particulate filter bag comprises ePTFE.

3. The filter apparatus of claim 2, wherein said particulate filter bag comprises a backing and an ePTFE laminate.

4. The filter apparatus of claim 3, wherein said ePTFE laminate is disposed upstream of said backing.

5. The filter apparatus of claim 3, wherein said backing comprises a fiberglass fabric.

6. The filter apparatus of claim 2, said particulate filter bag with an air permeability greater than 2 cfm/ft2 measured at a differential pressure of 0.5 inches water gauge and a filtration efficiency greater than 80% at 0.3 microns (5.3 cm/s).

7. The filter apparatus of claim 1, wherein said sleeve comprises a gaseous pollutant remediation material.

8. The filter apparatus of claim 7, wherein said sleeve comprises an adsorptive material.

9. The filter apparatus of claim 8, wherein said adsorptive material comprises a carbon fabric layer.

10. The filter apparatus of claim 9, wherein said carbon fabric layer comprises activated carbon fibers created from at least one of novolac and novoloid fibers.

11. The filter apparatus of claim 8, wherein said adsorptive material comprises activated carbon particles adhered to a support material of said sleeve by a polymer adhesive, wherein said polymer adhesive comprises (a) strings of polymer, and (b) dispersion primary polymer particles, whereby said carbon particles are tethered by said polymer adhesive.

12. The filter apparatus of claim 7, wherein said sleeve comprises a catalytic material.

13. The filter apparatus of claim 12, wherein said sleeve comprises at least one of a catalytic felt and a catalytic fabric.

14. The filter apparatus of claim 13, wherein a catalyst of said at least one of a catalytic felt and a catalytic fabric comprises at least one of noble metals, transition metal oxides, alkali and alkaline earth metals.

15. A filter apparatus for use in a reverse air filtration system, said apparatus comprising:
a particulate filter bag, said particulate filter bag having an inlet end for operative interconnection to a pollutant-laden fluid stream, said particulate filter bag defining an internal volume between said inlet end and an oppositely disposed cap end, said particulate filter bag having an upstream surface facing said internal volume and a downstream surface facing away from said internal volume;

at least one support disposed along a longitudinal axis of said particulate filter bag for support to maintain said internal volume;

the support comprising a plurality of rigid rings oriented perpendicular to said longitudinal axis, wherein said plurality of rigid rings are each interconnected to said particulate filter bag; and a sleeve removably disposed about said particulate filter bag and said at least one support, said sleeve disposed on said downstream surface side of said particulate filter bag, wherein said sleeve is in tension circumferentially about said particulate filter bag.

16. The filter apparatus of claim 1, further comprising a cap disposed at said cap end of said particulate filter bag, wherein said cap is operable to removably interconnect to said sleeve to retain said sleeve during operation of said reverse air filtration system.

17. The filter apparatus of claim 15, wherein said sleeve further comprises an abrasion resistant cuff disposed at an end of said sleeve corresponding to said inlet of said particulate filter bag.

18. The filter apparatus of claim 16, further comprising a hook extending from said cap in a direction opposite from said particulate filter bag.

19. A filter system comprising:

a particulate filter bag operable to filter particulates from a fluid stream, said particulate filter bag having an upstream side and a downstream side, said bag being defined as a first element, said upstream side operable to be oriented toward a fluid stream to be filtered, said particulate filter bag defining an internal volume between an inlet end and an oppositely disposed cap end, said upstream side of said first element facing said internal volume;

a second element to remove mercury from said fluid stream, said second element disposed on said downstream side of said first element, wherein said second element is disposed about said filter particulate filter bag, wherein said second element comprises a mercury adsorptive material for use in removing mercury from said fluid stream; and at least one support disposed along a longitudinal axis of said particulate filter bag for support to maintain said internal volume; the support comprising a plurality of rigid rings oriented perpendicular to said longitudinal axis, wherein said plurality of rigid rings are each interconnected to said particulate filter bag.

20. The filter system of claim 19, wherein said particulate filter bag comprises ePTFE.

21. The filter system of claim 20, wherein said particulate filter bag comprises a fiberglass fabric and ePTFE laminate.

22. The filter system of claim 20, said particulate filter bag with an air permeability greater than 2 cfm/ft2 measured at a differential pressure of 0.5 inches water gauge and a filtration efficiency greater than 80% at 0.3 microns (5.3 cm/s).

23. The filter system of claim 19, wherein said second element comprises activated carbon fibers created from at least one of novolac and novoloid fibers.

24. The filter system of claim 19, wherein said mercury adsorptive material comprises activated carbon particles adhered to a support material of said second element by a polymer adhesive, wherein said polymer adhesive comprises (a) strings of polymer, and (b) dispersion primary polymer particles, whereby said carbon particles are tethered by said polymer adhesive.

25. The filter system of claim 19, wherein said mercury adsorptive material is regenerable.

26. A filter system comprising:

a first element operable to filter particulates from a fluid stream, said first element having an upstream side and a downstream side, said upstream side operable to be oriented toward a fluid stream to be filtered;

a second element to remove mercury from said fluid stream, said second element disposed on said downstream side of said first element, wherein said second element comprises activated carbon fibers created from at least one of novolac and novoloid fibers; and at least one support disposed along a longitudinal axis of said first element for support to maintain an internal volume; the support comprising a plurality of rigid rings oriented perpendicular to said longitudinal axis, wherein said plurality of rigid rings are each interconnected to said first element.

27. The filter system of claim 26, wherein said first element is a particulate filter bag, wherein said particulate filter bag comprises a backing and an ePTFE laminate, wherein said backing comprises a fiberglass fabric.

28. The filter system of claim 26, wherein said first element is a particulate filter bag, wherein said particulate filter bag comprises ePTFE, wherein said particulate filter bag has an air permeability greater than 2 cfm/ft2 measured at a differential pressure of 0.5 inches water gauge and a filtration efficiency greater than 80% at 0.3 microns (5.3 cm/s).

29. The filter system of claim 26, wherein said filter system is a reverse air filtration system, wherein said first element is a particulate filter bag, wherein said second element is disposed about said first element, said first element defining said internal volume between an inlet end and an oppositely disposed cap end, said upstream side of said first element facing said internal volume.

30. The filter system of claim 26, wherein said filter system is a pulse jet filtration system, wherein said first element is a particulate filter bag, wherein said second element is disposed along said downstream side of said first element, said first element defining said internal volume between an outlet end and an oppositely disposed cap end, said downstream side of said first element facing said internal volume.

31. A filter system comprising:

a first element operable to filter particulates from a fluid stream, said first element having an upstream side and a downstream side, said upstream side operable to be oriented toward a fluid stream to be filtered;

a second element to remove mercury from said fluid stream, said second element disposed on said downstream side of said first element, wherein said second element comprises a mercury adsorptive material for use in removing mercury from said fluid stream, wherein said mercury adsorptive material comprises activated carbon particles adhered to a support material of said second element by a polymer adhesive, wherein said polymer adhesive comprises (a) strings of polymer, and (b) dispersion primary polymer particles, whereby said carbon particles are tethered by said polymer adhesive; and at least one support disposed along a longitudinal axis of said first element for support to maintain an internal volume; the support comprising a plurality of rigid rings oriented perpendicular to said longitudinal axis, wherein said plurality of rigid rings are each interconnected to said first element.

32. The filter system of claim 31, wherein said first element is a particulate filter bag, wherein said second element is disposed about said first element, said first element defining said internal volume between an inlet end and an oppositely disposed cap end, said upstream side of said first element facing said internal volume.

33. The filter system of claim 31, wherein said first element is a particulate filter bag, wherein said second element is disposed along said downstream side of said first element, said first element defining said internal volume between an outlet end and an oppositely disposed cap end, said downstream side of said first element facing said internal volume.

34. A filter apparatus for use in an air filtration system, said apparatus comprising:
a particulate filter bag, said particulate filter bag having a first end for operative interconnection to a tube sheet of a filtration system, said particulate filter bag defining an internal volume between said first end and an oppositely disposed cap end, said particulate filter bag having an upstream surface and a downstream surface;
a sleeve removably disposed adjacent to said downstream surface of said particulate filter bag, wherein said sleeve is regenerable; and
at least one support disposed along a longitudinal axis of said particulate filter bag for support to maintain said internal volume; the support comprising a plurality of rigid rings oriented perpendicular to said longitudinal axis, wherein said plurality of rigid rings are each interconnected to said particulate filter bag.

35. The filter apparatus of claim 34, wherein said particulate filter bag comprises ePTFE.

36. The filter apparatus of claim 34, wherein said sleeve comprises activated carbon fibers created from at least one of novolac and novoloid fibers.

37. The filter apparatus of claim 34, wherein said sleeve is operable to adsorb mercury from said pollutant-laden fluid stream, then desorb mercury when exposed to a desorb temperature that is elevated relative to a temperature of said fluid stream, and then re-adsorb mercury during subsequent exposure to said pollutant-laden fluid stream.

* * * * *